(12) United States Patent
Mayer (10) Patent No.: US 7,571,636 B2
(45) Date of Patent: Aug. 11, 2009

(54) DETECTING AND REPORTING THE LOCATION OF A LEAK IN HERMETICALLY SEALED PACKAGING

(75) Inventor: Daniel W. Mayer, Wyoming, MN (US)

(73) Assignee: Mocon, Inc., Minneapolis, MN (US)

( * ) Notice: Subject to any disclaimer, the term of this patent is extended or adjusted under 35 U.S.C. 154(b) by 38 days.

(21) Appl. No.: 11/813,684

(22) PCT Filed: Dec. 13, 2005

(86) PCT No.: PCT/US2005/045134

§ 371 (c)(1),
(2), (4) Date: Jul. 11, 2007

(87) PCT Pub. No.: WO2006/088542

PCT Pub. Date: Aug. 24, 2006

(65) Prior Publication Data

US 2008/0163677 A1    Jul. 10, 2008

Related U.S. Application Data

(60) Provisional application No. 60/652,637, filed on Feb. 14, 2005.

(51) Int. Cl.
*G01M 3/32* (2006.01)
(52) U.S. Cl. ...................................... 73/49.3
(58) Field of Classification Search ............... 73/40, 73/49.3, 861; 53/403
See application file for complete search history.

(56) References Cited

U.S. PATENT DOCUMENTS

| | | |
|---|---|---|
| 3,101,613 A | 8/1963 | Kuntz |
| 3,466,925 A | 9/1969 | Ziegehagen et al. |
| 3,498,110 A | 3/1970 | Burn |
| 3,555,884 A | 1/1971 | Yamamoto et al. |

(Continued)

FOREIGN PATENT DOCUMENTS

DE    4212938 A1    10/1993

(Continued)

OTHER PUBLICATIONS

Hanson, et al., "In Quest of Sterile Packaging: Part 1, Approaches to Package Testing", Medical Device & Diagnostic Industry, Aug. 1995, pp. 56-61.

(Continued)

*Primary Examiner*—John Fitzgerald
(74) *Attorney, Agent, or Firm*—Sherrill Law Offices, PLC (57) ABSTRACT

An instrument (10) for detecting and reporting the location of a leak in thin-walled hermetically sealed packaging (100) as between a seal leak and a side-wall leak. The instrument (10) includes a needle (20), a vacuum pump (40), and a means for creating at least two different steady-state differential pressure values across the packaging (100), a mass flow rate sensor (50), and at least one pressure sensor (31), a device for generating a perceptible signal (70) and a processor (60). The instrument (10) is operative for sensing the external pressure outside the packaging's (100) retention chamber, sensing the internal pressure within the retention chamber and transmitting an internal pressure signal, sensing the mass flow rate of gas pulled from the retention chamber, calculating flow rates and differential pressures thus indicating leaks.

2 Claims, 4 Drawing Sheets

U.S. PATENT DOCUMENTS

| | | | |
|---|---|---|---|
| 3,561,254 A | 2/1971 | Argaud et al. | |
| 3,633,416 A | 1/1972 | Van Dyke et al. | |
| 3,636,751 A | 1/1972 | Pasini, III et al. | |
| 3,672,207 A | 6/1972 | Cramp et al. | |
| 3,762,212 A | 10/1973 | Morley et al. | |
| 3,849,070 A | 11/1974 | Garza et al. | |
| 3,855,531 A * | 12/1974 | Fielibert et al. | 324/693 |
| 3,922,525 A | 11/1975 | Kozak et al. | |
| 3,952,580 A | 4/1976 | Bennett | |
| 3,956,923 A | 5/1976 | Young et al. | |
| 4,067,239 A | 1/1978 | Arvisenet | |
| 4,104,905 A | 8/1978 | Zachary | |
| 4,105,138 A | 8/1978 | Lemann et al. | |
| 4,133,736 A | 1/1979 | Nakagawa et al. | |
| 4,145,916 A | 3/1979 | Bott et al. | |
| 4,268,967 A | 5/1981 | Brana et al. | |
| 4,424,708 A | 1/1984 | Meuleman | |
| 4,555,934 A | 12/1985 | Freeman et al. | |
| 4,561,289 A | 12/1985 | Jones | |
| 4,593,554 A | 6/1986 | Aarts | |
| 4,622,643 A | 11/1986 | Dotson | |
| 4,627,270 A | 12/1986 | Jones | |
| 4,643,019 A | 2/1987 | Jones | |
| 4,671,100 A | 6/1987 | Doussiet | |
| 4,715,212 A | 12/1987 | Johanson | |
| 4,747,299 A | 5/1988 | Fox et al. | |
| 4,750,918 A | 6/1988 | Sirkar | |
| 4,774,830 A | 10/1988 | Hulsman | |
| 4,791,806 A | 12/1988 | Wade | |
| 4,852,415 A | 8/1989 | Bogatzki et al. | |
| 4,899,574 A | 2/1990 | Potteiger | |
| 4,922,746 A | 5/1990 | Hulsman et al. | |
| 4,934,180 A | 6/1990 | Hulsman | |
| 4,991,574 A | 2/1991 | Pocknell | |
| 5,042,291 A | 8/1991 | Lehmann | |
| 5,149,105 A | 9/1992 | Beaver et al. | |
| 5,150,605 A | 9/1992 | Simpson | |
| 5,156,329 A | 10/1992 | Farrell | |
| 5,163,315 A | 11/1992 | Asai et al. | |
| 5,203,822 A | 4/1993 | Gurich et al. | |
| 5,212,993 A | 5/1993 | Mayer | |
| 5,226,316 A | 7/1993 | Mally et al. | |
| 5,285,678 A | 2/1994 | McDaniel et al. | |
| 5,307,696 A | 5/1994 | Allain et al. | |
| 5,319,957 A | 6/1994 | Stieger et al. | |
| 5,332,008 A | 7/1994 | Todd et al. | |
| 5,333,491 A | 8/1994 | Lehmann | |
| 5,345,814 A | 9/1994 | Cur et al. | |
| 5,365,774 A | 11/1994 | Horlacher | |
| 5,404,747 A | 4/1995 | Johnston et al. | |
| 5,433,120 A | 7/1995 | Boyd et al. | |
| 5,497,654 A | 3/1996 | Lehmann | |
| 5,499,529 A | 3/1996 | Kronberg et al. | |
| 5,513,516 A | 5/1996 | Stauffer | |
| 5,564,306 A | 10/1996 | Miller | |
| 5,570,694 A | 11/1996 | Rometsch | |
| 5,591,899 A | 1/1997 | Griesbeck | |
| 5,728,929 A | 3/1998 | Gevaud | |
| 5,777,203 A | 7/1998 | Stymne | |
| 5,831,147 A | 11/1998 | Hoath | |
| 5,850,036 A | 12/1998 | Giromini | |
| 5,891,076 A | 4/1999 | Fabo | |
| 5,915,270 A | 6/1999 | Lehmann | |
| 5,919,476 A | 7/1999 | Fischer et al. | |
| 5,939,619 A | 8/1999 | Achter et al. | |
| 6,018,987 A | 2/2000 | Mayer et al. | |
| 6,050,133 A | 4/2000 | Achter et al. | |
| 6,139,801 A | 10/2000 | Kawachi et al. | |
| 6,189,223 B1 | 2/2001 | Haug | |
| 6,308,556 B1 | 10/2001 | Sagi et al. | |
| 6,324,926 B1 | 12/2001 | Lehtinen et al. | |
| 6,354,138 B1 | 3/2002 | Ascheman et al. | |
| 6,382,011 B1 | 5/2002 | Mayer et al. | |
| 6,450,011 B1 | 9/2002 | Mayer et al. | |
| 6,450,012 B1 | 9/2002 | Mayer et al. | |
| 6,460,405 B1 | 10/2002 | Mayer et al. | |
| 6,609,414 B2 | 8/2003 | Mayer et al. | |
| 6,935,199 B2 | 8/2005 | Wickland et al. | |
| 6,981,403 B2 | 1/2006 | Ascheman et al. | |
| 7,252,014 B1 | 8/2007 | Mayer et al. | |
| 2002/0069691 A1 | 6/2002 | Roberts et al. | |
| 2003/0084957 A1 | 5/2003 | Seitz et al. | |
| 2006/0011237 A1 | 1/2006 | Tison et al. | |
| 2007/0266773 A1 | 11/2007 | Mayer et al. | |
| 2007/0289390 A1 | 12/2007 | Ascheman | |

FOREIGN PATENT DOCUMENTS

| | | |
|---|---|---|
| EP | 0445002 A2 | 4/1991 |
| EP | 0646781 | 4/1995 |
| EP | 0883774 B1 | 2/1997 |
| EP | 09904793 A2 | 9/1998 |
| GB | 2311865 A | 4/1997 |
| JP | 57127830 A * | 8/1982 |
| JP | 2122234 A | 5/1990 |
| JP | 6201432 | 7/1994 |
| WO | 2006/076110 A2 | 7/2006 |
| WO | 2006/083400 A2 | 8/2006 |

OTHER PUBLICATIONS

Jones, et al., "In Quest of Sterile Packaging: Part 2, Physical Package Integrity Test Methods", Medical Device & Diagnostic Industry, Sep. 1995, pp. 81-85.

Arndt, George W. Jr., "Examination of Containers for Integrity", Bacteriological Analytical Manual Online, Jan. 2001, pp. 1-31, United States Food & Drug Administration.

* cited by examiner

DETECTING AND REPORTING THE LOCATION OF A LEAK IN HERMETICALLY SEALED PACKAGING

FIELD OF INVENTION

The invention relates to instruments and techniques for detecting leaks in hermetically sealed packaging.

BACKGROUND

Products susceptible to spoilage, such as processed foods, nuts and sliced fruits and vegetables, are often placed in hermetically sealed packaging which has been flushed with an inert gas, such as nitrogen or argon, to achieve an oxygen concentration within the packaging of less than about 3% and thereby prolong the shelf-life of the product. Such packaging is commonly known as controlled atmosphere packaging (CAP) or modified atmosphere packaging (MAP).

Leaks in the packaging can significantly reduce the anticipated shelf life, resulting in undesired spoilage. Hence, proper quality control efforts for CAP/MAP typically involve at least periodic testing of packaging to determine if the packaging has any leaks.

A variety of instruments and methods are known for detecting leaks in hermetically sealed packaging. Leak detection typically involves the creation of a pressure differential between the pressure inside the packaging (internal pressure) and the pressure outside the packaging (external pressure)— such as by compressing the packaging or pulling a vacuum in the atmosphere surrounding the packaging, followed by the detection of any change in a given variable which could be correlated to the presence of a leak in the packaging. Specific examples include submersion of packaging into a liquid and detecting any liquid within the packaging (U.S. Pat. No. 6,763,702 issued to Allen Chien et al.), squeezing packaging and detecting any pressure decay (U.S. Pat. No. 6,427,524 issued to Frank Raspante et al.), squeezing packaging and detecting any volume decay (U.S. Pat. No. 5,533,385 issued to William Frievalt) and placing packaging within a vacuum chamber and detecting any loss of vacuum (U.S. Pat. No. 5,150,605 issued to Edwin Simpson).

Leaks in hermetically sealed packaging typically result from (i) the presence of a pinhole in the packaging material created during manufacture of the packaging material or puncturing of the packaging during the form, fill and/or seal process (commonly known as a sidewall leak), or (ii) the presence of a channel through a seal in the packaging created by inadequate sealing of the filled packaging (commonly known as seal leaks). In the event leaks are detected in an unacceptable number of packages, the first step in correcting the problem is to identify whether the leaks are predominantly seal leaks or sidewall leaks.

While the instruments and techniques described above are generally effective for detecting leaks in hermetically sealed packaging, none are capable of detecting the presence of a leak and reliably reporting the location of the leak as between a seal leak and a sidewall leak.

SUMMARY OF THE INVENTION

A first aspect of the invention is an instrument for detecting and reporting the location of a leak in thin-walled hermetically sealed packaging as between a seal leak and a sidewall leak. The instrument includes (A) a needle having a lumen, (B) a vacuum pump, (C) a means for creating at least two different steady-state $\Delta P$ values across the packaging as between a first $\Delta P$ value and a second $\Delta P$ value, (D) a mass flow rate sensor, (E) at least one pressure sensor, (F) a device for generating a perceptible signal, and (G) a processor. The needle is operable for perforating the hermetically sealed packaging so as to place the lumen of the needle in fluid communication with a retention chamber defined by the packaging. The vacuum pump is in fluid communication with the lumen defined by the needle for evacuating gaseous content from the hermetically sealed packaging to form an evacuated retention chamber exhibiting an internal steady-state pressure, whereby a steady-state pressure differential ($\Delta P$) exists across the packaging as between an external steady-state pressure outside the retention chamber and the internal steady-state pressure within the retention chamber. The mass flow rate sensor is in sealed fluid communication with the lumen defined by the needle for sensing a first mass flow rate pulled through the lumen from the evacuated retention chamber by the vacuum pump at the first $\Delta P$, sensing a second mass flow rate pulled through the lumen from the evacuated retention chamber by the vacuum pump at the second $\Delta P$, and transmitting corresponding mass flow rate signals. The pressure sensor is operative for (i) sensing the external pressure outside the retention chamber and transmitting an external pressure signal, and (ii) sensing the internal pressure within the retention chamber and transmitting an internal pressure signal. The processor is interconnected and programmed to (i) receive the mass flow rate signals, (ii) receive the external pressure signal, (iii) receive the internal pressure signal, (iv) calculate a first ratio of mass flow rate to $\Delta P$ at the first $\Delta P$ and a second ratio of mass flow rate to $\Delta P$ at the second $\Delta P$, (v) calculate a variation between the first ratio and the second ratio, and (vi) generate a first perceptible signal indicating that the packaging contains a sidewall leak when the variation is equal to or greater than a threshold value and generate a second perceptible signal indicating that the packaging contains a seal leak when the variation is less than the threshold value.

A second aspect of the invention is a computerized method for detecting and reporting the location of a leak in thin-walled hermetically sealed packaging as between a seal leak and a sidewall leak. The method comprises the steps of (A) perforating the hermetically sealed packaging so as to place a lumen in fluid communication with a retention chamber defined by the packaging, (B) evacuating a gaseous content from the retention chamber through the lumen so as to form an evacuated retention chamber exhibiting an internal steady-state pressure, whereby a first steady-state pressure differential ($\Delta P$) exists across the packaging as between an external steady-state pressure outside the retention chamber and the internal steady-state pressure within the retention chamber, (D) sensing an external pressure of a gas outside the evacuated retention chamber at the first $\Delta P$, (E) sensing an internal pressure within the evacuated retention chamber at the first $\Delta P$, (F) sensing a first mass flow rate through the lumen from the evacuated retention chamber at the first $\Delta P$, (F) repeating at least one of (D) and (E) along with (F) at the second $\Delta P$, (G) calculating a first ratio of mass flow rate to $\Delta P$ at the first $\Delta P$ and a second ratio of mass flow rate to $\Delta P$ at the second $\Delta P$, (H) calculating a variation between the first ratio and the second ratio, and (I) generating a first perceptible signal indicating that the packaging contains a sidewall leak when the variation is equal to or greater than a threshold value and generate a second perceptible signal indicating that the packaging contains a seal leak when the variation is less than the threshold value.

DETAILED DESCRIPTION OF THE INVENTION INCLUDING A BEST MODE

Nomenclature
10 Instrument
15 Housing
16 Inlet Port Through the Housing
17 Outlet Port Through the Housing
18 Access Port Through the Housing
20 Needle
21 Distal End of Needle
29 Lumen of Needle
31 First Pressure Sensor
32 Second Pressure Sensor
40 Vacuum Pump (Variable Speed)
50 Mass Flow Rate Sensor
60 Processor
65 Memory
70 Collective Reference to Leads 70a, 70b, 70c and 70d.
70a Lead from the First Pressure Sensor to the Processor
70b Lead from the Second Pressure Sensor to the Processor
70c Lead from the Vacuum Pump to the Processor
70d Lead from the Mass Flow Rate Sensor to the Processor
71 Leads from the Processor to the Battery
80 Collective Reference to Tubing 80a, 80b and 80c
80a Length of Tubing Interconnecting the Needle and the First Pressure Sensor
80b Length of Tubing Interconnecting the First Pressure Sensor and the Vacuum Pump
80c Length of Tubing Interconnecting the Vacuum Pump and the Mass Flow Rate Sensor
81 Length of Tubing from the Mass Flow Rate Sensor to the Exit Port through the Housing
82 Length of Tubing from the Second Pressure Sensor to the Access Port through the Housing
90 User Interface Components
91 Power Button
92 Display Device
100 Packaging
100a Thickness of Packaging Wall
101 Solids Content of Packaging
102 Gaseous Content of Packaging
109 Retention Chamber Defined by Packaging
110 Packaging Seal
110a Length of Packaging Seal
120 Hole in Packaging
200 Septum
300 Battery
$r_{seal}$ Radius of Hole Through Seal
$r_{side}$ Radius of Hole Through Sidewall
C Clear Button
S Start Button Definitions As utilized herein, including the claims, the phrase "thin-walled" means a wall having a thickness of less than about 0.1 mm.

As utilized herein, including the claims, Poiseuille's Law refers to the mathematical equation set forth below which was developed by the French physician Jean Poiseuille to describe the rate of flow of a fluid through a tube based upon the diameter, length and pressure drop along the tube.

$$R=[(\pi)(r^4)(\Delta P)]/(8\,\mu L)$$

Where:
R=rate of flow
r=inside radius of the pipe
$\Delta P = P_1 - P_2$ wherein
$P_1$=pressure at one end of the pipe
$P_2$=pressure at the other end of the pipe
μ=viscosity of the fluid flowing through the pipe
L=length of the pipe Poiseuille's Law can be meaningfully adapted to describe the rate of flow of a fluid through a hole in packaging by equating each of the variables in the equation as set forth below.
R=rate of flow through the hole
r=radius of the hole
$P_1$=pressure outside the packaging
$P_2$=pressure inside the packaging
μ=viscosity of the fluid flowing into the packaging through the hole
L=length of the hole, wherein L is either
$L_{seal}$=length of a hole through a seal in the packaging
$L_{side}$=length of a hole through a sidewall in the packaging Underlying Discovery The invention disclosed herein is based upon the discovery that Poiseuille's Law can accurately and consistently describe the rate of flow through a seal leak in thin-walled packaging 100, but does not accurately and consistently describe the rate of flow through a sidewall leak in thin-walled packaging 100. Without intending to be limited to a specific theory, it is believed that Poiseuille's Law does not accurately and consistently describes the rate of flow through a sidewall leak in thin-walled packaging 100 as such flow tends to be nonlaminar in nature.

For any given packaging 100 having a leak, the radius "r" of the hole 109 through the packaging 100 and the length "L" of the hole 109 though the packaging will be unknown, but a constant unknown. Hence for a given package 100 Poiseuille's Law can be represented as R=(ΔP)(K) wherein K=[(π)(r⁴)]/(8 μL). This equation can be rewritten as R/ΔP=K. We have discovered that since this equation accurately describes the rate of flow through a seal leak in thin-walled packaging 100, the ratio of R to ΔP will remain substantially constant at different ΔPs for seal leaks. We have also discovered that since this equation does not accurately describe the rate of flow through a sidewall leak in thin-walled packaging 100, the ratio of R to ΔP tends to vary substantially at different ΔPs for sidewall leaks.

The specific extent to which the ratio of R to ΔP varies at different ΔPs for sidewall leaks can be readily determined by those skilled in the art through routine experimentation. This value—as a fixed value or a variable value dependent upon such variables as the actual thickness of the packaging sidewall or the value of ΔP—can be employed as a threshold value for determining whether a ratio of R to ΔP at different ΔPs are sufficiently similar to indicate a seal leak or sufficiently dissimilar to indicate a sidewall leak.

Structure

Figure 1:
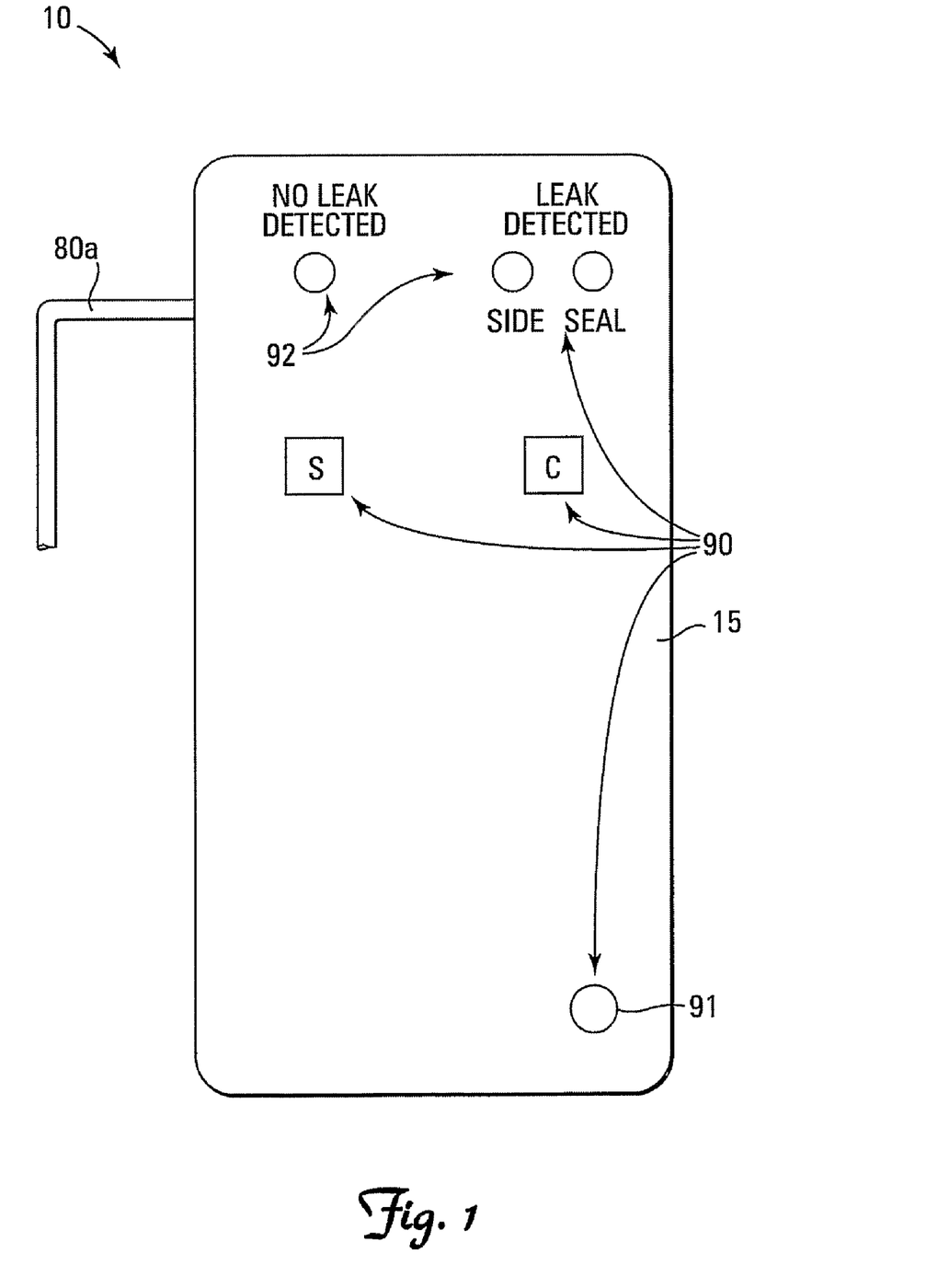
FIG. 1 is a front view of one embodiment of the invention depicted with an evacuated thin-walled flexible packaging.
Figure 2:
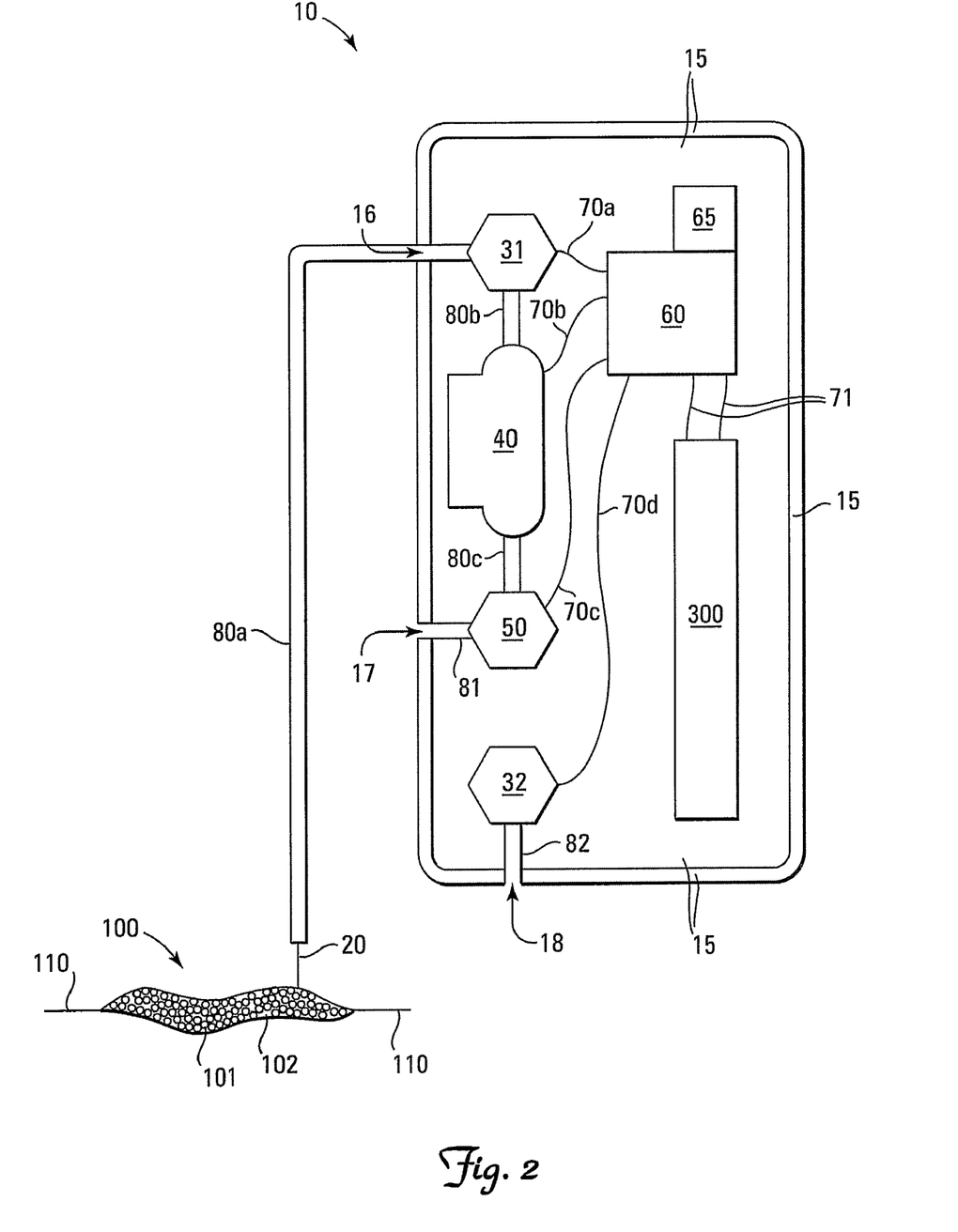
FIG. 2 is a front view of the invention shown in FIG. 1 with the cover of the housing removed to facilitate viewing of the internal components.

As shown in FIGS. 1 and 2, a first aspect of the invention is an instrument 10 for detecting and reporting the location of a leak in thin-walled hermetically sealed packaging 100 as between a seal leak and a sidewall leak.

The instrument 10 can be effectively employed with a wide variety of thin-walled hermetically sealed packaging 100 ranging from fairly rigid packaging such as thin-walled polyvinyl chloride tubes, through semi-flexible packaging such as wax-coated cartons and thin-walled polyethylene bottles, to flexible packaging such as bags made from polyethylene terephthalate (i.e., MYLAR®) or polyethylene films.

Referring to FIGS. 1 and 2, the first aspect of the instrument 10 includes a needle 20, a first pressure sensor 31, a second pressure sensor 32, a vacuum pump 40, a mass flow rate sensor 50, and a processor 60. Appropriate tubing 80a, 80b, and 80c (hereinafter collectively referenced as tubing 80) sequentially interconnect the needle 20, first pressure sensor 31, vacuum pump 40, and mass flow rate sensor 50, respectively. Appropriate electrical leads 70a, 70b, 70c and 70d (hereinafter collectively referenced as electrical leads 70) electrically connect the processor 60 to the first pressure sensor 31, the second pressure sensor 32, the vacuum pump 40, and the mass flow rate sensor 50, respectively.

Figure 3:
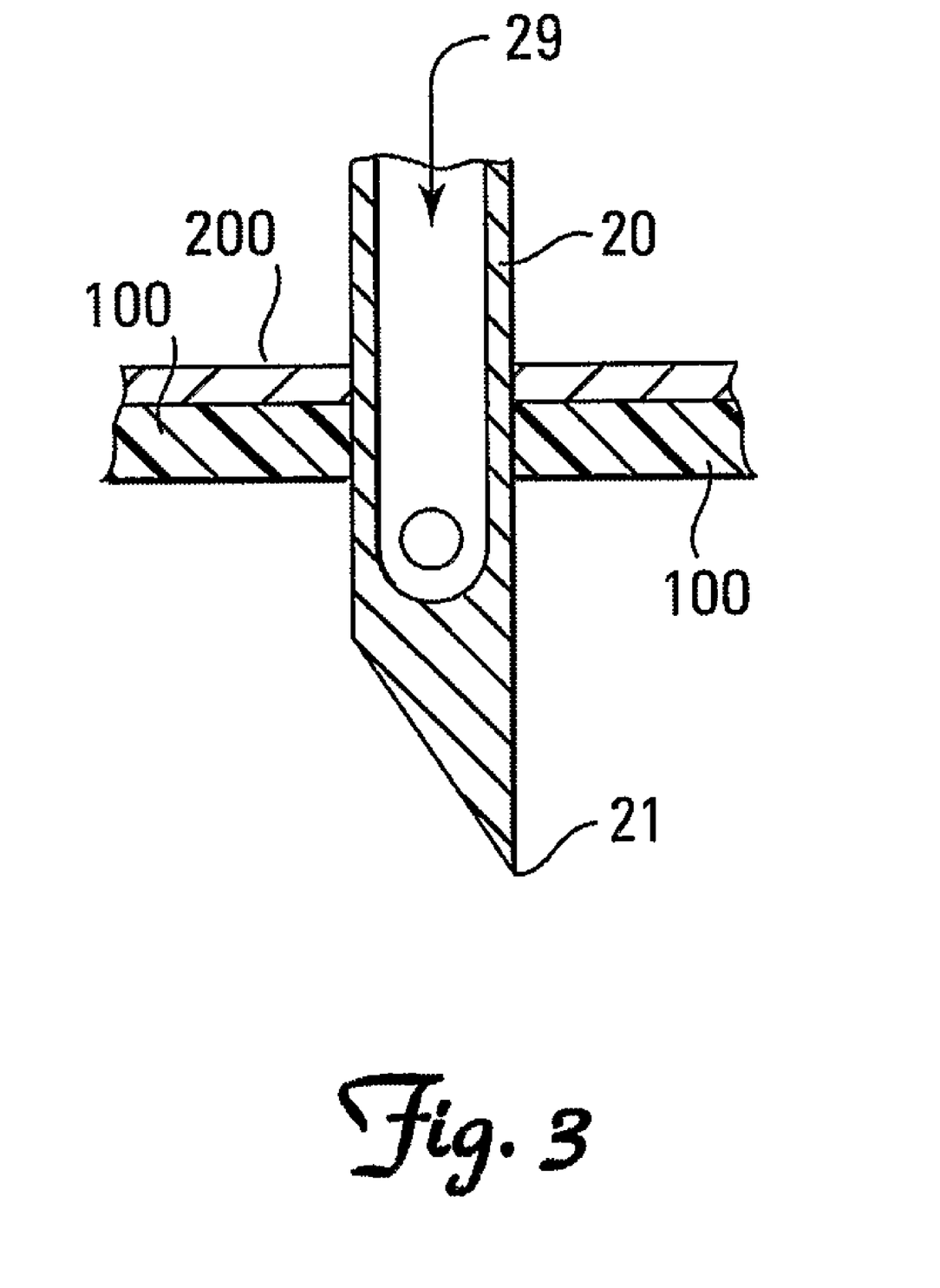
FIG. 3 is an enlarged cross-sectional side view of the distal end of the needle shown in FIG 1.
Figures 4, 5:
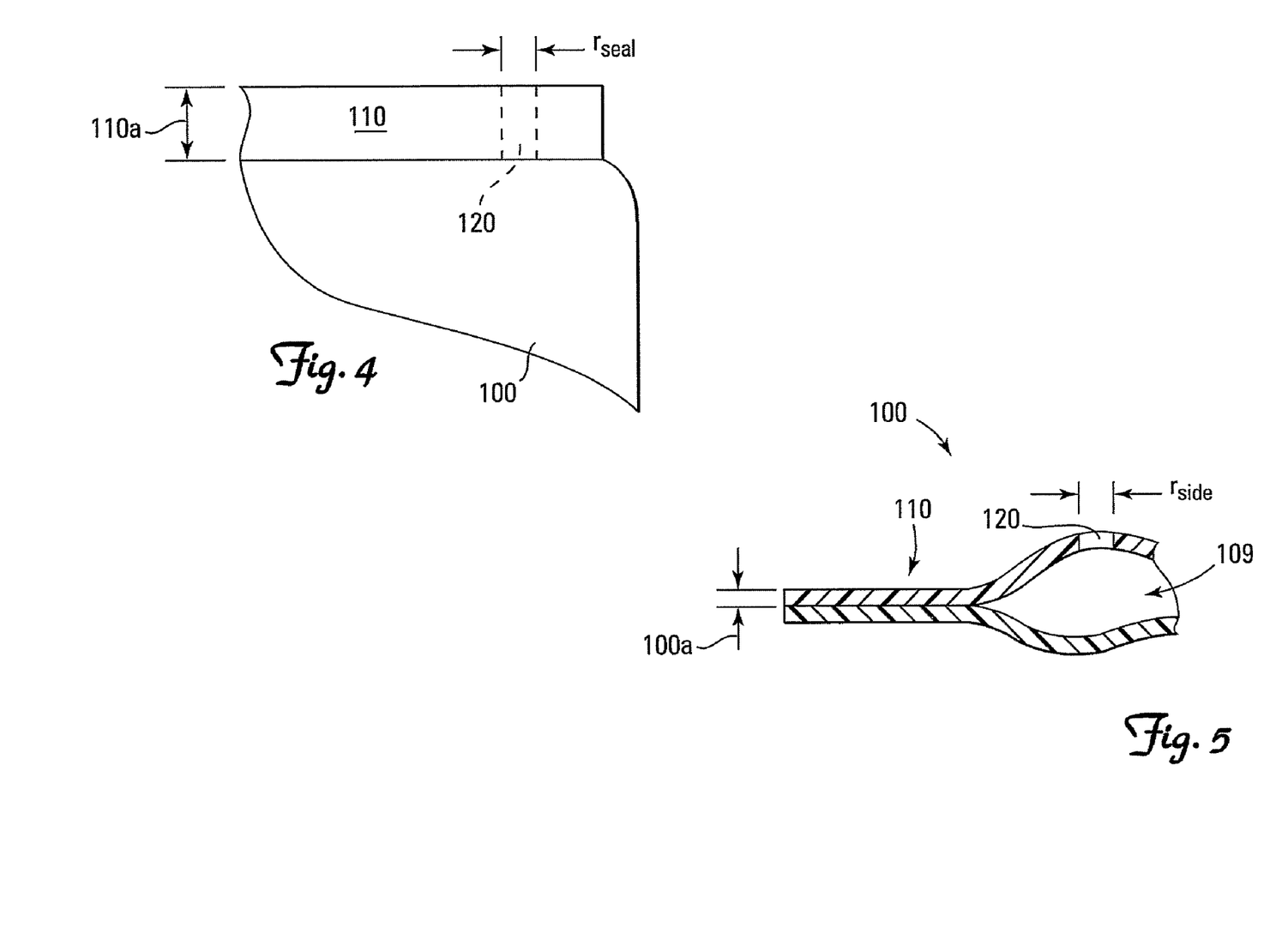
FIG. 4 is an enlarged top view of one corner of a hermetically sealed packaging with a hole through the seal.
FIG. 5 is an enlarged cross-sectional side view of one end of a hermetically sealed packaging with a hole through the packaging wall.

As shown in FIG. 3, the needle 20 is configured and arranged with a lumen 29 and a sharp pointed distal end 21 effective for piercing a sidewall (unnumbered) of the packaging 100. A septum 200 is preferably adhered to the sidewall of the packaging 100—especially when the packaging 100 is highly flexible—prior to piercing of the packaging 100 with the needle 20 in order to maintain a hermetic seal around the needle 20.

Referring to FIG. 2, a vacuum pump 40 is sealingly connected to the lumen 29 of the needle 20 by tubing 80. Once the needle 20 has been inserted through packaging 100, operation of the vacuum pump 40 is effective for evacuating the gaseous content 102 from the retention chamber 109 defined by the packaging 100 through the lumen 29 of the needle 20 and creating a vacuum within the retention chamber 109.

Substantially any type of vacuum pump 40 is suitable for use in the instrument 10, with selection dependent primarily upon choice of power source (i.e., battery or electrical power lines), desired level of portability (i.e., hand-held or desktop), and intended use (i.e., testing of large volume or small volume packaging). For most applications, a vacuum pump 40 with a maximum gas volumetric flow rate of about 250 to 1,000 cm$^3$/minute and capable of pulling a maximum vacuum of about 1-15 lb/in$^2$, preferably 4-8 lb/in$^2$, using standard consumer batteries (e.g., AAA, AA, A, C, D or 9-volt batteries) will be sufficient.

Referring to FIG. 2, a first pressure sensor 31 is employed between the needle 20 and the vacuum pump 40 for measuring and reporting the pressure within the evacuated retention chamber 109. The internal pressure sensed by the first pressure sensor 31 after the gaseous content 102 has been evacuated from the retention chamber 109 and a steady state vacuum has been established within the retention chamber 109 is the value "$P_2$" utilized to calculate ΔP.

Referring again to FIG. 2, a second pressure sensor 32 is employed to measure and report the atmospheric pressure surrounding the outside of the packaging 100. The external pressure sensed by the second pressure sensor 32 is the value "$P_1$" utilized to calculate ΔP.

A cost-effective alternative to employing the second pressure sensor 32 is to utilize the first pressure sensor 31 to sense both the internal $P_2$ and external $P_1$ pressures by taking a pressure reading with the first pressure sensor 31 while the lumen 29 defined by the needle 20 is still in fluid communication with the surrounding environment (i.e., before the needle 20 is inserted into the packaging 100).

The instrument 10 must include some means for creating at least two different steady-state ΔP values (i.e., $P_1$-$P_2$) across the packaging as between a first ΔP value and a second ΔP value. A variety of devices or systems may be employed to create two different steady-state ΔP values including specifically, but not exclusively (i) placing the packaging 100 within a pressure chamber (not shown) and selectively changing the external pressure $P_1$, (ii) employing two different vacuum pumps 40 effective for creating different internal pressures $P_2$ within the packaging 100 and a three-way valve (not shown) effective for selectively placing one of the pumps 40 in fluid communication with the lumen 29 in a first mode and placing the other pump 40 in fluid communication with the lumen 29 in a second mode, (iii) incorporating a restriction valve (not shown) between the needle 20 and the vacuum pump 40 which is effective for selectively providing essentially unrestricted fluid flow through the valve in a first mode and restricted fluid flow through the valve in a second mode, (iv) incorporating a three-way valve (not shown) between the needle 20 and the vacuum pump 40 which can be selectively opened and closed to the introduction of ambient air into the tubing 80 (provided the additional mass flow introduced into the tubing 80 when the valve is open can be accurately determined and subtracted from the mass flow rate measured by the mass flow rate sensor 50), etc. Other systems and devices for achieving a selective change in ΔP across the packaging 100 would be known and understood by those of skill in the art and are also encompassed within the scope of this invention.

Referring to FIG. 2, one method for achieving two different steady-state ΔP values across the packaging 100 as between a first ΔP value and a second ΔP value is to employ a variable speed vacuum pump 40 with the speed controlled by the processor 60.

As shown in FIG. 2, a mass flow rate sensor 50 is positioned downstream from the vacuum pump 40 for measuring the mass flow rate pulled from the evacuated retention chamber 109 by the vacuum pump 40. The mass flow rate sensor 50 may alternatively be positioned upstream from the vacuum pump 40. The mass flow rate of interest is the mass flow rate measured after the gaseous content 102 has been evacuated from the retention chamber 109 and a steady state vacuum has been established within the retention chamber 109. The mass flow rate measured at this stage is the value of "R" utilized in determining the ratio of R to ΔP.

Suitable gas mass flow rate sensors 50 for use in the instrument 10 are available from a number of sources, including MKS Instruments of Wilmington, Mass.

Referring to FIG. 2, the first pressure sensor 31, second pressure sensor 32, vacuum pump 40, and mass flow rate sensor 50 are operably interconnected to a microcontroller or processor 60 by appropriate leads 70 for controlling operation of the various components, and receiving and processing the data signals generated by the various sensors. The processor 60 is connected to a suitable power source, such as a battery 300, by electrical leads 71. These components, along with the associated electrical leads 70, tubing 80 and a power source such as a battery 300, are preferably retained within a single housing 15 which is equipped with (i) an inlet port 16 configured and arranged to attach to a length of tubing 80a in order to place the needle 20 into fluid communication with the components retained within the housing 15, (ii) an outlet port 17 attached by a length of tubing 81 to the mass flow rate sensor 50 for venting gas pumped from the retention chamber 109 by the vacuum pump 40, and (iii) an access port 18 attached by a length of tubing 82 to the second pressure sensor 32 for placing the second pressure sensor 32 into sensible contact with the surrounding atmosphere.

Referring to FIG. 1, the front face (unnumbered) of the housing 15 includes the necessary and appropriate user interface components 90 including (i) a power ON/OFF switch 91, and (ii) a device for generating a perceptible signal 92 indicating that the packaging 100 contains no detectable leak, a seal leak or a sidewall leak, such as a speaker (not shown), an LCD screen (not shown), a plurality of labeled or color coded lights as shown in FIG. 2, etc. The display device 92 is operably interconnected to the microcontroller or processor 60.

As shown in FIG. 2, the microcontroller or processor 60 includes associated memory 65 for storing data values received from the various sensors 31, 32 and 50.

The microcontroller or processor 60 is programmed to (1) operate at a first mode (e.g., operation of a variable speed vacuum pump 40 at a first speed) effective to create a first steady-state $\Delta P$ value and receive data values at the first $\Delta P$ for (i) the pressure outside the packaging 100 from the second pressure sensor 32—which will be utilized as the value "$P_1$" to determined the value of the first $\Delta P$, (ii) the pressure inside the packaging 100 from the first pressure sensor 31—which will be utilized as the value "$P_2$" to determine the value of the first $\Delta P$, and (iii) the mass flow rate through the hole 120 from the mass flow rate sensor 50—which will be utilized as the value "R" in calculating a first ratio of mass flow rate to $\Delta P$ at the first $\Delta P$, (2) operate at a second mode (e.g., operation of a variable speed vacuum pump 40 at a second speed) effective to create a second steady-state $\Delta P$ value and receive data values at the second $\Delta P$ for (i) the pressure outside the packaging 100 from the second pressure sensor 32—which will be utilized as the value "$P_1$" to determined the value of the second $\Delta P$, (ii) the pressure inside the packaging 100 from the first pressure sensor 31—which will be utilized as the value "$P_2$" to determine the value of the second $\Delta P$, and (iii) the mass flow rate through the hole 120 from the mass flow rate sensor 50—which will be utilized as the value "R" in calculating a second ratio of mass flow rate to $\Delta P$ at the second $\Delta P$. After receiving these values, the microcontroller or processor 60 then either (A) generates a perceptible signal indicating NO LEAK DETECTED when the value of R—at the first $\Delta P$ and/or second $\Delta P$ as appropriate—is less than a predetermined threshold value for R, or (B) proceeds to determine whether the detected leak is a seal leak or a sidewall leak when the value of R is greater than or equal to the predetermined threshold value for R. The microcontroller or processor 60 determines whether the detected leak is a seal leak or a sidewall leak by (i) calculating a first ratio of mass flow rate to $\Delta P$ at the first $\Delta P$, (ii) calculating a second ratio of mass flow rate to $\Delta P$ at the second $\Delta P$, (iii) calculating a variation between the first ratio and the second ratio, and (iv) comparing the calculated variation to a threshold value for the variation. The microcontroller or processor 60 generates a first perceptible signal indicating that the packaging contains a SIDEWALL LEAK when the variation is equal to or greater than the variation threshold value, and generates a second perceptible signal indicating that the packaging contains a SEAL LEAK when the variation is less than the variation threshold value.

The instrument 10 may be constructed as a portable or desktop unit.

Use

A unit of packaging 100 having a solids content 101 and a gaseous content 102 is selected for analysis. The power switch 91 is depressed to activate the instrument 10 and the START button S is depressed. The instrument 10 may optionally direct the user to insert the needle 20 into the test packaging 100.

A septum 200 is optionally adhered to the outer surface (unnumbered) of the packaging 100. The septum 200 and packaging 100 are perforated by the distal end 21 of the needle 20 a sufficient distance to place the lumen 29 into fluid communication with the retention chamber 109 defined by the packaging 100. The needle 20 is then left in the inserted position for the balance of the procedure.

The user then initiates analysis by again pressing the START button S. The vacuum pump 40 is activated to evacuate the gaseous content 102 from the retention chamber 109 defined by the packaging 100 and pull a vacuum. The processor 60 causes whatever means is employed for creating different steady-state $\Delta P$ values across the packaging 100 (i.e., a variable speed vacuum pump 40) to operate in a first mode which will create a first $\Delta P$ across the packaging 100. The first pressure sensor 31, second pressure sensor 32, and mass flow rate sensor 50 are activated to sense the internal pressure "$P_2$", external pressure "$P_1$" and mass flow rate "R" through the tubing 80 at the first steady-state $\Delta P$. These values are transmitted to the processor 60.

After receiving these values the processor 60 compares the value of R with a threshold value for R and in the event the actual value for R is less than the threshold value for R, generates a perceptible signal indicating NO LEAK DETECTED and discontinues the balance of the testing procedure.

In the event the actual value for R is greater than or equal to the threshold value for R, the processor 60 then causes whatever means is employed for creating different steady-state $\Delta P$ values across the packaging 100 to operate in a second mode which will create a second $\Delta P$ across the packaging 100. The first pressure sensor 31, second pressure sensor 32, and mass flow rate sensor 50 are again activated to sense the internal pressure "$P_2$", external pressure "$P_1$" and mass flow rate "R" through the tubing 80 at the second steady-state $\Delta P$. These values are also transmitted to the processor 60. It is noted that in circumstances where the external pressure $P_1$ is not likely to change during the testing procedure, the external pressure $P_1$ need not be sensed and transmitted a second time.

The processor 60 then utilizes the set of transmitted values for $P_1$, $P_2$ and R at each $\Delta P$ to determine whether the detected leak is a seal leak or a sidewall leak by (i) calculating a first ratio of mass flow rate to $\Delta P$ at the first $\Delta P$, (ii) calculating a second ratio of mass flow rate to $\Delta P$ at the second $\Delta P$, (iii) calculating a variation between the first ratio and the second ratio, and (iv) comparing the calculated variation to a threshold value for the variation. The microcontroller or processor 60 generates a first perceptible signal indicating that the packaging 100 contains a SIDEWALL LEAK when the variation is equal to or greater than the variation threshold value, and generates a second perceptible signal indicating that the packaging 100 contains a SEAL LEAK when the variation is less than the variation threshold value.

It is noted that in the event the packaging 100 has multiple holes 120 through the packaging sidewall or multiple holes

120 through the packaging seal 110, the instrument 10 remains effective for accurately reporting the presence of a leak and the location of the leak as between a seal leak or a sidewall leak. However, in the relatively rare event that the packaging 100 has at least one hole 120 through the sidewall and at least one hole through the seal 110, the existence of a leak will be reported but the location of only one leak will be reported.

The testing procedure can then be repeated by pressing the CLEAR button C followed by pressing the START button S.

I claim:

1. An instrument comprising:
   (a) a needle having a lumen operable for perforating a hermetically sealed packaging so as to place the lumen of the needle in fluid communication with a retention chamber defined by the packaging;
   (b) a vacuum pump in fluid communication with the lumen defined by the needle effective for evacuating gaseous content from the hermetically sealed packaging to form an evacuated retention chamber exhibiting an internal steady-state pressure, whereby a steady-state pressure differential ($\Delta P$) exists across the packaging as between an external steady-state pressure outside the retention chamber and the internal steady-state pressure within the retention chamber;
   (c) a means for creating at least two different steady-state $\Delta P$ values across the packaging as between a first $\Delta P$ value and a second $\Delta P$ value;
   (d) a mass flow rate sensor in sealed fluid communication with the lumen defined by the needle for sensing a first mass flow rate pulled through the lumen from the evacuated retention chamber by the vacuum pump at the first $\Delta P$, sensing a second mass flow rate pulled through the lumen from the evacuated retention chamber by the vacuum pump at the second $\Delta P$, and transmitting corresponding mass flow rate signals;
   (e) at least one pressure sensor operative for (i) sensing the external pressure outside the retention chamber and transmitting an external pressure signal, and (ii) sensing the internal pressure within the retention chamber and transmitting an internal pressure signal;
   (f) a device for generating a perceptible signal; and
   (g) a processor interconnected and programmed to (i) receive the mass flow rate signals, (ii) receive the external pressure signal, (iii) receive the internal pressure signal, (iv) calculate a first ratio of mass flow rate to $\Delta P$ at the first $\Delta P$ and a second ratio of mass flow rate to $\Delta P$ at the second $\Delta P$, (v) calculate a variation between the first ratio and the second ratio, and (vi) generate a first perceptible signal indicating that the packaging contains a sidewall leak when the variation is equal to or greater than a threshold value and generate a second perceptible signal indicating that the packaging contains a seal leak when the variation is less than the threshold value.

2. A method comprising the steps of:
   (a) perforating a hermetically sealed packaging so as to place a lumen in fluid communication with a retention chamber defined by the packaging;
   (b) evacuating a gaseous content from the retention chamber through the lumen so as to form an evacuated retention chamber exhibiting an internal steady-state pressure, whereby a first steady-state pressure differential ($\Delta P$) exists across the packaging as between an external steady-state pressure outside the retention chamber and the internal steady-state pressure within the retention chamber;
   (c) sensing an external pressure of a gas outside the evacuated retention chamber at the first $\Delta P$;
   (d) sensing an internal pressure within the evacuated retention chamber at the first $\Delta P$;
   (e) sensing a first mass flow rate through the lumen from the evacuated retention chamber at the first $\Delta P$;
   (f) repeating at least one of (c) and (d) along with (e) at the second $\Delta P$;
   (g) calculating a first ratio of mass flow rate to $\Delta P$ at the first $\Delta P$ and a second ratio of mass flow rate to $\Delta P$ at the second $\Delta P$;
   (h) calculating a variation between the first ratio and the second ratio; and
   (i) generating a first perceptible signal indicating that the packaging contains a sidewall leak when the variation is equal to or greater than a threshold value and generate a second perceptible signal indicating that the packaging contains a seal leak when the variation is less than the threshold value.

* * * * *